US009075913B2

(12) United States Patent
Bourd et al.

(10) Patent No.: US 9,075,913 B2
(45) Date of Patent: Jul. 7, 2015

(54) VALIDATION OF APPLICATIONS FOR GRAPHICS PROCESSING UNIT

(75) Inventors: Alexei V. Bourd, San Diego, CA (US); Jay Chunsup Yun, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 587 days.

(21) Appl. No.: 13/406,272

(22) Filed: Feb. 27, 2012

(65) Prior Publication Data

US 2013/0227521 A1 Aug. 29, 2013

(51) Int. Cl.
*G06F 9/45* (2006.01)
*G06F 9/44* (2006.01)
*G06F 21/00* (2013.01)
*G06F 11/36* (2006.01)
*G06F 11/07* (2006.01)
*G06F 21/56* (2013.01)

(52) U.S. Cl.
CPC ........ *G06F 11/3652* (2013.01); *G06F 11/3604* (2013.01); *G06F 11/3612* (2013.01); *G06F 11/3664* (2013.01); *G06F 11/0736* (2013.01); *G06F 11/0751* (2013.01); *G06F 11/0793* (2013.01); *G06F 21/566* (2013.01)

(58) Field of Classification Search
None
See application file for complete search history.

(56) References Cited

U.S. PATENT DOCUMENTS

| 5,313,635 | A | 5/1994 | Ishizuka et al. |
| 5,761,512 | A | 6/1998 | Breslau et al. |
| 5,987,256 | A | 11/1999 | Wu et al. |
| 6,370,687 | B1 | 4/2002 | Shimura |
| 7,174,544 | B2 | 2/2007 | Zee |
| 7,340,730 | B2 | 3/2008 | Arkwright et al. |
| 7,587,712 | B2 | 9/2009 | Mountain et al. |
| 7,650,639 | B2 | 1/2010 | Kramer et al. |
| 7,667,709 | B2 | 2/2010 | Zimmer |
| 7,707,563 | B2 | 4/2010 | Wei |
| 7,797,747 | B1 * | 9/2010 | Ferrie ............................. 726/24 |
| 7,986,325 | B1 | 7/2011 | Gold et al. |
| 8,271,964 | B2 | 9/2012 | Zorn et al. |
| 8,294,723 | B2 * | 10/2012 | Labour et al. .................. 345/522 |
| 8,397,241 | B2 * | 3/2013 | Xiaocheng et al. ........... 719/312 |

(Continued)

FOREIGN PATENT DOCUMENTS

| JP | 5088907 A | 4/1993 |
| JP | H05342012 A | 12/1993 |

(Continued)

OTHER PUBLICATIONS

Kerr et al., "Chapter 30: GPU Application Development, Debugging, and Performance Tuning with GPU Ocelot," In Wen-mei W. Hwu, GPU Computing Gems Jade Edition, Morgan Kaufmann, ISBN: 978-0-12-385963-1, Nov. 2, 2011,15 pp.

(Continued)

*Primary Examiner* — Don Wong
*Assistant Examiner* — Devayani R Talukdar
(74) *Attorney, Agent, or Firm* — Shumaker & Sieffert, P.A.

(57) ABSTRACT

The techniques described in this disclosure are directed to validating an application that is to be executed on a graphics processing unit (GPU). For example, a validation server device may receive code of the application. The validation server device may provide some level of assurance that the application satisfies one or more performance criteria. In this manner, the probability of a problematic application executing on the device that includes the GPU may be reduced.

26 Claims, 4 Drawing Sheets

(56) References Cited

U.S. PATENT DOCUMENTS

| | | | |
|---|---|---|---|
| 8,462,166 B2* | 6/2013 | Sowerby et al. | 345/522 |
| 8,479,295 B2* | 7/2013 | Sahita et al. | 726/24 |
| 8,584,242 B2* | 11/2013 | Lagar-Cavilla et al. | 726/24 |
| 2006/0098019 A1 | 5/2006 | Tarditi, et al. | |
| 2007/0169066 A1 | 7/2007 | Nielsen | |
| 2007/0202941 A1 | 8/2007 | Miltenberger et al. | |
| 2007/0211064 A1 | 9/2007 | Buck et al. | |
| 2008/0127135 A1 | 5/2008 | Bergstrom et al. | |
| 2009/0113402 A1 | 4/2009 | Chen et al. | |
| 2010/0100963 A1 | 4/2010 | Mahaffey | |
| 2011/0035736 A1* | 2/2011 | Stefansson et al. | 717/149 |
| 2011/0102443 A1* | 5/2011 | Dror et al. | 345/522 |
| 2011/0145920 A1 | 6/2011 | Mahaffey et al. | |
| 2011/0145926 A1 | 6/2011 | Dalcher et al. | |
| 2011/0173693 A1 | 7/2011 | Wysopal et al. | |
| 2013/0155083 A1* | 6/2013 | McKenzie et al. | 345/522 |
| 2013/0226535 A1* | 8/2013 | Tuan | 703/2 |

FOREIGN PATENT DOCUMENTS

| | | |
|---|---|---|
| JP | H11184690 A | 7/1999 |
| JP | 2000122871 A | 4/2000 |
| JP | 2001195264 A | 7/2001 |
| JP | 2003216434 A | 7/2003 |
| JP | 2005521179 A | 7/2005 |
| JP | 2007524875 A | 8/2007 |
| KR | 20030000926 A | 1/2003 |
| KR | 1020060006272 A | 1/2006 |
| WO | 03085600 A1 | 10/2003 |
| WO | 2006019622 A1 | 2/2006 |
| WO | WO2011072971 A1 | 6/2011 |

OTHER PUBLICATIONS

Second Written Opinion of international application No. PCT/US2013/023874, dated Mar. 19, 2014, 6 pp.

International Search Report and Written Opinion of international application No. PCT/US2013/023874, dated May 14, 2013, 12 pp.

Dowty et al., "GPU Virtualization on VMWare's Hosted I/O Architecture," Nov. 3, 2008, found at http://static.usenix.org/event/wiov08/tech/full_papers/dowty/dowty_html/, 16 pp.

"High Performance Computing (HPC), Amazon Web Services, accessed Jul. 4, 2011, found at http://aws.amazon.com/hpc-applications/, 2 pp."

Humphreys G., etal., "Distributed Rendering for Scalable Displays", Computer Science Department Stanford University, Proceeding of the IEEE/ACM SC2000 Conference (SC00), 2000.

McWatters, D. NVIDIA Cg and CG Compiler. Jun. 13, 2002. Tweak 3D. [retrieved on Jun. 17, 2011]. Retrieved from the Internet:<URL: www.tweak3d.net/articles/nvidia/cg/>.

Tehver, M. Design and Applications of a Real-Time Shading System. 2004. pp. 1-35. [retrieved on Jun. 16, 2011]. Retrieved from the Internet: <URL: http://dspace.utlib.ee/dspace/bitstream/handle/10062/610/Tehver.pdf;jsessionid=5B15FDFBC1E0BF0D2ECBB1E4EFFAF430?sequence=5>.

Banerjee et al., "Remote Execution for 3D Graphics on Mobile Devices", International Conference on Wireless Networks, Communications and Mobile Computing, IEEE, 2005, pp. 1154-1159, [retrieved on Sep. 18, 2012], Retrieved from the Internet: <URL:http://ieeexplore.ieee.org/>.

Kamiyoshi, "Special Issue—Whole story about embedded Java," Part 2 Embedded environment a la carte, Chapter 2 Embedded Java and network, compiling technology for network, JCOD system, Japan, Java Press. Gijyutsu-Hyohron Co., Ltd., Apr. 10, 2000, First Edition. vol. 11, pp. 75-76. Partial Translation of Relevant Portion.

Lamberti et al., "An Accelerated Remote Graphics Architecture for PDAs", Proceedings of the eighth international conference on 3D Web technology, ACM, 2003, 7 pages, Retrieved from the Internet: URL:http://dl.acm.org/. (In accordance with MPEP § 609.04(a), Applicant points out that the 2003 year of publication is sufficiently earlier than the effective U.S. filed and any foreign priority date so that the particular month of publication is not in issue.).

Matsubara, "Microsoft Beleaguered by Java Enjoying Tumultuous Popularity", Nikkei Byte, Japan, Nikkei Business Publications, Inc., Mar. 22, 1996, No. 150, pp. 134-143. Partial Machine Translation.

Oneda Y "Special Issue-Master Direct X9!—Part 3. Use of shading language," C Magazine, vol. 15, No. 2 (vol. 161), Japan, Softbank Publishing Co., Ltd., Feb. 1, 2003, 31-32. Partial Translation of Relevant Portion.

* cited by examiner

VALIDATION OF APPLICATIONS FOR GRAPHICS PROCESSING UNIT

TECHNICAL FIELD

This disclosure is directed to applications that execute on a graphics processing unit (GPU), and more particularly, to validation of such applications.

BACKGROUND

Graphics processing units (GPUs) traditionally have been limited to performing only graphics related processing in fixed-function pipelines that provide very limited functional flexibility. Newer GPUs include programmable cores that execute programs, and thereby provide greater functional flexibility as compared to the traditional GPUs. The programmable cores may execute both graphics related applications and non-graphics related applications.

SUMMARY

In general, this disclosure is related to techniques for identifying potentially problematic applications that are to be executed on a graphics processing unit (GPU), prior to execution. Examples of problematic applications include, but are not limited to, malicious applications, as well as inefficient or error-prone applications. For example, a server device external to the device that houses the GPU may validate the application. Validation of the application may mean that the application satisfies one or more criteria. As one example, validation may mean determining with some level of assurance that the application is not a malicious application, an error-prone application, or an inefficient application. The server device may transmit an indication, to the device, that indicates whether it is either safe or unadvisable for the GPU to execute the program. The device may then elect to execute the program on the GPU based on the received indication.

In one example, the disclosure describes a method that includes receiving, with a server device, an application that is to be executed by a graphics processing unit (GPU) that resides on a device external to the server device. The method also include performing, with the server device, at least one of an analysis of the application prior to and during compilation of the application on the server device, and an analysis of the application during execution of the application on the server device. The method further includes determining whether the application satisfies one or more performance criteria based on at least one of the analyses, and transmitting to the device a validation of the application if the application satisfies the one or more performance criteria.

In another example, the disclosure describes an apparatus that includes an emulator unit operable to receive an application that is to be executed by a graphics processing unit (GPU) that resides on a device external to the apparatus. The emulator unit is also operable to perform at least one of an analysis of the application prior to and during compilation of the application on the apparatus, and an analysis of the application during execution of the application on the apparatus. The emulator unit is also operable to determine whether the application satisfies one or more performance criteria based on at least one of the analyses, and transmit to the device a validation of the application if the application satisfies the one or more performance criteria.

In another example, the disclosure describes a server device that includes means for receiving an application that is to be executed by a graphics processing unit (GPU) that resides on a device external to the server device. The server device also includes means for performing at least one of an analysis of the application prior to and during compilation of the application on the server device, and an analysis of the application during execution of the application on the server device. The server device further includes means for determining whether the application satisfies one or more performance criteria based on at least one of the analyses, and means for transmitting to the device a validation of the application if the application satisfies the one or more performance criteria.

In another example, the disclosure describes a non-transitory computer-readable storage medium comprising instructions that cause one or more processors to receive, with a server device, an application that is to be executed by a graphics processing unit (GPU) that resides on a device external to the server device. The instructions further cause one or more processors to perform, with the server device, at least one of an analysis of the application prior to and during compilation of the application on the server device, and an analysis of the application during execution of the application on the server device. The instructions also cause the one or more processors to determine whether the application satisfies one or more performance criteria based on at least one of the analyses, and transmit to the device a validation of the application if the application satisfies the one or more performance criteria.

In another example, the disclosure describes a method that includes receiving an application that is to be executed by a graphics processing unit (GPU) of a device, and transmitting the application to a server device external to the device for validation of the application. The method further includes receiving a validation from the server device that indicates that the application satisfies one or more criteria for execution on the GPU.

In another example, the disclosure describes an apparatus that includes a graphics processing unit (GPU), and a device memory operable to store an application that is to be executed by the GPU. The apparatus also includes a processor operable to transmit the application to a server device external to the apparatus, and receive a validation from the server device that indicates that the application satisfies one or more criteria for execution on the GPU.

In another example, the disclosure describes a device that includes a graphics processing unit (GPU). The device also includes means for receiving an application that is to be executed by the GPU, and means for transmitting the application to a server device external to the device for validation of the application. The device further includes means for receiving a validation from the server device that indicates that the application satisfies one or more criteria for execution on the GPU.

In another example, the disclosure describes a non-transitory computer-readable storage medium comprising instructions that cause one or more processors to receive an application that is to be executed by a graphics processing unit (GPU) of a device, and transmit the application to a server device external to the device for validation of the application. The instructions further cause the processor to receive a validation from the server device that indicates that the application satisfies one or more criteria for execution on the GPU.

The details of one or more aspects of the disclosure are set forth in the accompanying drawings and the description below. Other features, objects, and advantages of the disclosure will be apparent from the description and drawings, and from the claims.

DETAILED DESCRIPTION

In general, this disclosure is related to techniques to ensure proper functionality of applications that are to be executed on a graphics processing unit (GPU). Some previous GPUs included only fixed-function hardware pipelines which did not provide programming capabilities. However, to increase functional flexibility, newer GPUs allow for programmable shader cores. For example, these GPUs execute applications such as vertex shaders and fragment shaders that perform functions that were previously delegated to components of the fixed-function hardware pipelines.

While programmable shader cores allow for functional flexibility, they also invite misuse or suboptimal use of the GPU. For example, a malicious developer may develop an application that generates a denial of service attack or a virus. In some instances, a developer, who may not have malicious intent, may nevertheless inadvertently develop an inefficient or error-prone application. A problematic application (e.g., a malicious, inefficient or error-prone application) can substantially undermine the operation of the GPU or a device in which the GPU is provided.

The techniques of this disclosure may assist in identifying possibly malicious, inefficient and/or error-prone GPU-executed applications, prior to execution by the GPU. For example, the techniques of this disclosure may be directed to a cloud-based solution in which a server device, external to the device that houses the GPU, and coupled to the device housing the GPU via one or more network connections, functions as an emulator for execution of an application. The server may emulate the results of the application, as if the application is executing on the GPU. Based on the results, the server may validate the application (e.g., determine whether or not the program is malicious, inefficient, or error-prone), and indicate as such to the device that houses the GPU. The GPU may then execute the application based on the received indication.

There may be various ways in which the server may execute a validation process to validate the application. The validation process may be a software process. The software process may be executed in conjunction with general purpose processor and/or special purpose hardware. For example, the server may execute virtual model software. The virtual model causes the server to emulate the GPU or the actual device that includes GPU upon which the application will execute. In alternate examples, instead of or in addition to virtual models, the server may include a hardware emulation board to validate the application. The server may also include an application that is specifically designed to test security violations of the application that is be executed by the GPU.

To validate the application that is to be executed by the GPU, the server may perform static analysis, dynamic analysis, or a combination thereof. Static analysis refers to analysis of the application that can be performed without execution of the application. For instance, static analysis can be performed during compilation. During the compilation, the server may identify errors in the application such as infinite loops in the program or out-of-bounds access to array locations within the application as two non-limiting examples.

Dynamic analysis refers to analysis of the application during execution, which may additionally result in identifying problematic applications (e.g., malicious, inefficient, and error-prone applications). For example, the server may execute compiled code, and the server may provide the executed code with hypothetical input values. The hypothetical input values may be, for example, different input images, input images with different sizes, and the like.

The server, executing a validation process, may monitor the results and the functions performed by the executed code. For example, the server may monitor memory accesses by the virtual model of the GPU, and determine whether the memory accesses are out-of-bounds memory accesses. The server may also monitor the memory addresses where the virtual model of the GPU is writing information. Based on the memory accesses of the virtual model of the GPU and memory addresses where the virtual model of the GPU is writing information, the server may be able to determine whether the application is error-prone. Such memory tracking may be particularly useful when the application reads or writes to variables using pointers.

The server may also detect applications that generate or enable denial of service attacks. For example, the server may monitor the rate at which the virtual model of the GPU is able to execute the application. If the server detects slow responsiveness, unintended termination, or hanging, the server may determine that the application is an application designed for a denial of service attack, or a very poorly designed application. In either case, execution of such an application may negatively impact the experience of a user.

In addition to validating the application, in some examples, the server may be able to tune and optimize the application as well. For example, the server may insert or replace the source code, or portions of the source code, or collect statistics to determine how well the compiled code works. In some examples, the server may validate the application and optimize or tune the application once. After such validation, the device may execute the application as often as the user would like without requiring further validations or optimization. Also, in some examples, after validating a certain application, the server may store an indication that indicates that this application has already been validated. If the server receives the same source code or pre-compiled object code again, the server may first ensure that the code is identical, and if so, immediately validate that application.

Figure 1:
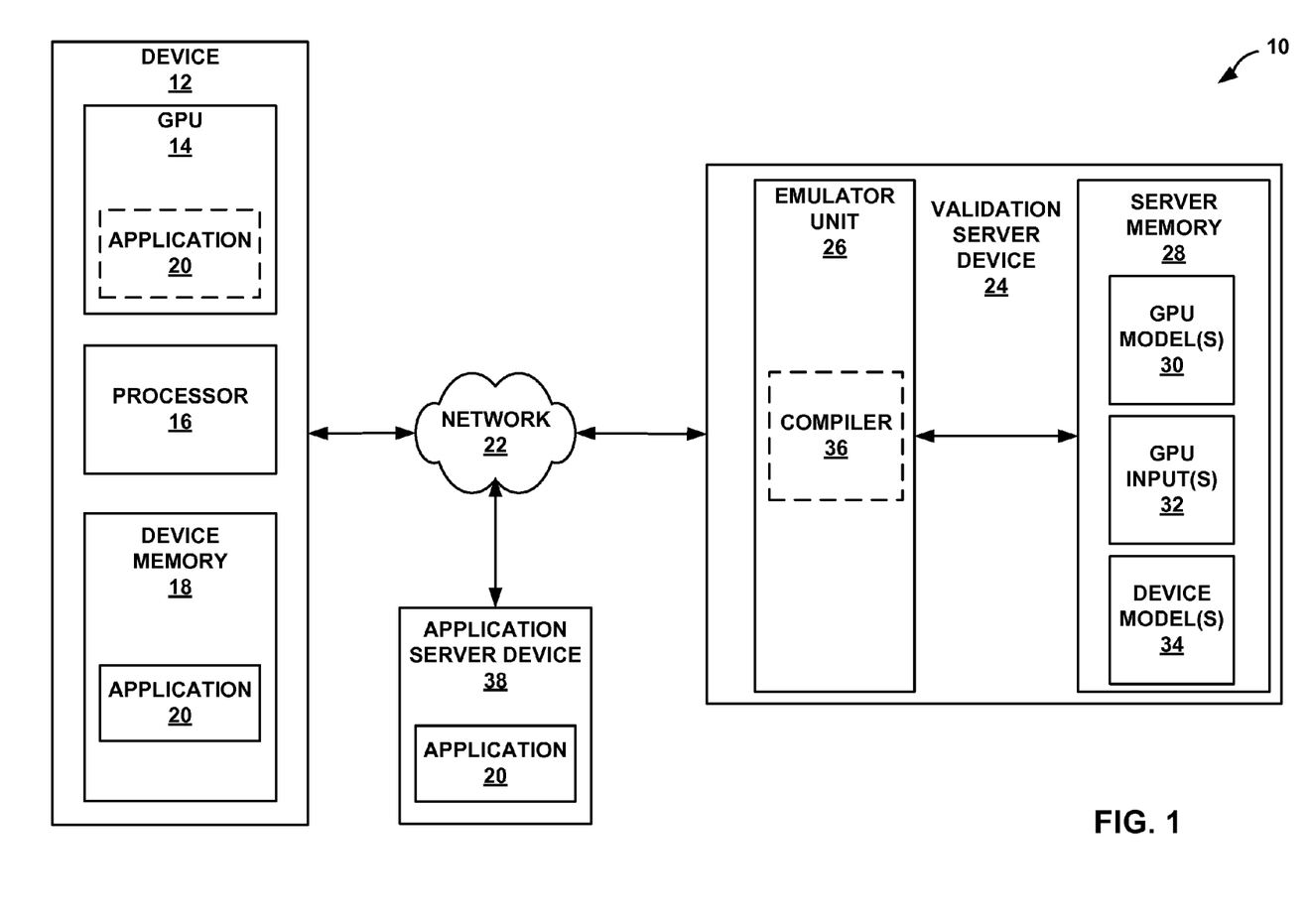
FIG. 1 is a block diagram illustrating an example of a system that may be operable to implement one or more aspects of this disclosure.

FIG. 1 is a block diagram illustrating an example of a system that may be operable to implement one or more aspects of this disclosure. For example, FIG. 1 illustrates system 10 that includes device 12, network 22, validation server device 24, and application server device 38. Although only one device 12, validation server device 24, and application server device 38 is illustrated in FIG. 1, in other examples, system 10 may include a plurality of devices 12, validation servers 24, and application servers 38. System 10 may be referred to as a cloud-based system to indicate that validation of application 20 occurs in validation server device 24, which is external to device 12, as described in more detail. For example, the techniques of this disclosure may be directed to validating application 20 in the cloud (e.g., in validation server device 24, which is external to device 12).

Examples of device 12 include, but are not limited to, video devices such as media players, set-top boxes, wireless handsets such as mobile telephones, personal digital assistants (PDAs), desktop computers, laptop computers, gaming consoles, video conferencing units, tablet computing devices, and the like. Examples of validation server device 24 and application server device 38 include, but are not limited to, laptops, desktops, web servers, and the like. In general, validation server device 24 and application server device 38 may be any type of device capable of performing the functions attributed to validation server device 24 and application server device 38 in this disclosure.

Network 22 may allow device 12 to securely communicate with validation server device 24 and application server device 38. For security purposes, any communication between device 12 and validation server device 24 and application server device 38 may be encrypted or otherwise secured. Also, for further protection, any communication between device 12 and validation server device 24 and application server device 38 may require user authorization.

In some examples, network 22 may ensure that information transmitted by any one of device 12, validation server device 24, and application server device 38 is received only by the intended device or devices, and no other device. Network 22 may be a local area network (LAN), a wide area network (WAN), the Internet, and the like. Device 12, validation server device 24, and application server device 38 may be coupled to network 22 wirelessly or through a wired link. In some examples, it may be possible for device 12 to be coupled directly to validation server device 24 and/or application server device 38. For example, device 12 may directly communicate with validation server device 24 and/or application server device 38 through a wireless or wired connection. In these examples, network 22 may not be needed in system 10.

Figure 5:
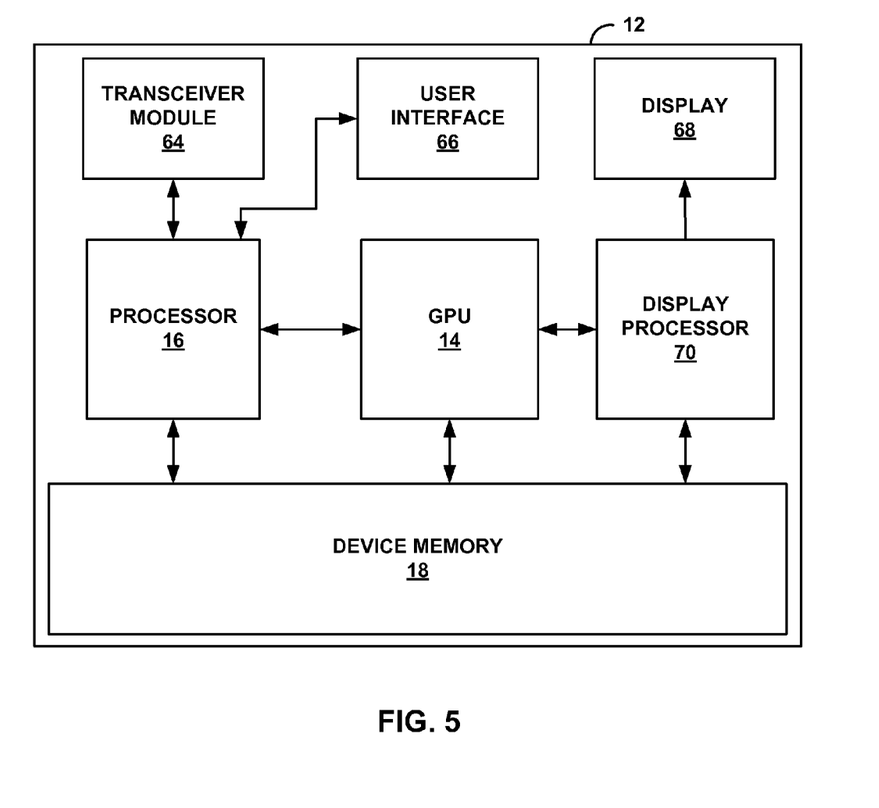
FIG. 5 is a block diagram illustrating an example device, illustrated in FIG. 1, in further detail.

As illustrated in FIG. 1, device 12 may include GPU 14, processor 16, and device memory 18. Device 12 may include components in addition to those illustrated in FIG. 1. For example, FIG. 5 illustrates an example of device 12 that includes more components than those illustrated in FIG. 1.

Examples of GPU 14 and processor 16 include, but are not limited, to a digital signal processor (DSP), a general purpose microprocessor, an application specific integrated circuit (ASIC), a field programmable logic array (FPGA), or other equivalent integrated or discrete logic circuitry. Furthermore, although GPU 14 and processor 16 are illustrated as separate components, aspects of this disclosure are not so limited. In alternate examples, GPU 14 and processor 16 may be part of a common integrated circuit. For purposes of illustration and ease of description, GPU 14 and processor 16 are illustrated as separate components.

Examples of device memory 18 include, but are not limited to, a random access memory (RAM), a read only memory (ROM), or an electrically erasable programmable read-only memory (EEPROM). Examples of device memory 18 may also include storage devices such as CD-ROM or other optical disk storage, magnetic disk storage, or other magnetic storage devices, flash memory. In general, device memory 18 may include mediums that can be used to store desired program code in the form of instructions or data structures and that can be accessed by GPU 14 and processor 16. In some examples, device memory 18 may comprise one or more computer-readable storage media, such as a computer-readable storage device. For instance, in some example implementations, device memory 18 may include instructions that cause GPU 14 and processor 16 to perform the functions ascribed to GPU 14 and processor 16 in this disclosure.

Device memory 18 may, in some examples, be considered as a non-transitory storage medium. The term "non-transitory" may indicate that the storage medium is not embodied in a carrier wave or a propagated signal. However, the term "non-transitory" should not be interpreted to mean that device memory 18 is non-movable. As one example, device memory 18 may be removed from device 12, and moved to another device. As another example, a storage device, substantially similar to device memory 18, may be inserted into device 12. In certain examples, a non-transitory storage medium may store data that can, over time, change (e.g., in RAM).

GPU 14 may be operable to execute one or more software applications. For example, GPU 14 may include a processor core on which one or more software applications may execute. The applications that execute on GPU 14 may be graphics applications such as vertex shaders and fragment shaders for generating graphics data. However, it may be possible for the applications that execute on GPU 14 to be unrelated to graphics processing. For example, a developer may consider it beneficial to exploit the massive parallelism of GPU 14 and develop a software application unrelated to graphics processing that exploits the massive parallelism of GPU 14. In these cases, GPU 14 may be referred to as a general purpose GPU (GP-GPU).

As one example, FIG. 1 illustrates GPU 14 executing application 20. Application 20 may be a graphics application or a non-graphics application that executes on GPU 14. Application 20 is illustrated in a dashed box within GPU 14 to indicate that application 20 is executing on GPU 14. GPU 14 does not actually include application 20. For instance, application 20 may be stored in device memory 18, as illustrated in FIG. 1.

Application 20 may be developed using a wide variety of different programming application processing interfaces (APIs). For example, a developer may have developed application 20 using any programming API such as OpenGL, OpenCL, WebGL, and WebCL. In general, applications that are developed using the OpenGL or WebGL APIs are designed for graphics processing. Applications that are developed using the OpenCL or WebCL APIs are designed for processing unrelated to graphics processing. The OpenGL, OpenCL, WebGL, and WebCL APIs are provided for illustration purposes and should not be considered limiting. The techniques of this disclosure may be extendable to APIs in addition to the examples provided above. In general, the techniques of this disclosure may be extendable to any technique utilized by a developer to develop application 20.

As illustrated, device memory 18 may store application 20. For example, a user of device 12 may cause device 12 to download application 20 from application server device 38 via network 22. In turn, device 12 may store application 20 in device memory 18. There may be other ways in which device 12 stores application 20 in device memory 18. For instance, a user of device 12 may insert a FLASH drive into device 12 that stores application 20, and device 12 may retrieve application 20 from the FLASH drive and store application 20 in device memory 18. In this example, application server device 38 may not be needed. The above examples that describe the manner in which device 12 stores application 20 in device memory 18 are provided for purposes of illustration and should not be considered limiting. The techniques of this disclosure may be applicable to any technique in which application 20 is loaded into device memory 18.

Device memory 18 may store the source code of application 20, intermediate representation of application 20, or object code of application 20. The source code of application 20 may be the text in the programming language in which application 20 was developed. The object code of application 20 may be the binary bits resulting from the compilation of application 20. For example, application server device 38 may compile the source code of application 20, and device 12 may download this pre-compiled object code of application 20. The intermediate representation of application 20 may be intermediate to the source code and the object code. For example, in the intermediate representation of application 20, the variables of the source code of application 20 may be replaced with register or memory identifiers for where the variables will be stored in device memory 18.

The capability of the programmable core or cores of GPU 14 to execute applications, such as application 20, increases the functionality of GPU 14. However, the capability of GPU 14 to execute applications may invite misuse or suboptimal use of GPU 14 and make device 12 more susceptible to malicious applications or error-prone applications. For example, applications that execute solely on a central processing unit (CPU), such as processor 16, execute applications in a virtual machine setting which allocates the amount of memory of device memory 18 and storage locations within device memory 18 that are accessible to the applications. Because the applications are confined to the virtual machine of processor 16, the applications are unable to access out-of-bounds memory addresses and are limited to accessing memory addresses specifically provided to it by the virtual machine of processor 16. In this way, it may be difficult for applications executing on processor 16 to drastically impact processor 16, and device 12, in turn, in a negative manner.

In some instances, it may not be practical to implement virtual machines on GPU 14. For example, the massive parallel processing capabilities of GPU 14 may not be well suited for executing virtual machines. For instance, if virtual machines were to execute on GPU 14, the virtual machines would dominate the resources of GPU 14, possibly restricting other applications from being executed on GPU 14. Accordingly, in some instances, virtual machines may not be able to limit the negative impacts of malicious or error-prone applications that execute on GPU 14.

Applications that execute on GPU 14, such as application 20, may be considered as applications that execute "natively" (i.e., are not confined to a virtual machine). Native execution of application 20 may allow for application 20 to access larger portions of device memory 18. Such access may allow problematic application such as malicious applications or poorly designed (e.g., error-prone) applications to negatively impact the performance capabilities of GPU 14 and device 12.

As one example, the developer of application 20 may develop application 20 such that application 20, when executed, provokes a denial of service attack on device 12, or propagates a virus that impacts the performance of device 12. For example, when GPU 14 executes application 20, application 20 may control GPU 14 such that GPU 14 may not be able to perform any other tasks such as rendering graphics content for a user interface. This may cause device 12 to "hang," which may drastically impact the functionality of device 12. In some cases, the developer of application 20 may develop application 20 to access portions of device memory 18 that it should be limited from accessing. Application 20 may store instructions for a virus in these portions of device memory 18. Then, when processor 16 or GPU 14 accesses these portions of device memory 18, processor 16 or GPU 14 may accidentally execute the stored virus. There may be additional examples of malicious applications, and aspects of this disclosure should not be considered limited to denial of service attacks or viruses.

As another example, the developer of application 20 may inadvertently develop application 20 such that application 20 is inefficient or error-prone. For instance, an error-prone application may include infinite loops, out-of-bounds access to an array, or out-of-bounds access to memory locations of device memory 18. An inefficient application may not properly utilize the functionality of GPU 14. For example, an inefficient application may not properly use the programmable functionality of GPU 14.

In some cases, application server device 38 may potentially provide a modicum of protection from malicious and error-prone applications. For example, the owner of application server device 38 may guarantee that none of the applications stored on application server device 38 are malicious or error-prone applications. However, this may not be the case in every instance (e.g., the owner of application server device 38 may not provide a guarantee of safe and proper operation), or the purported "guarantee" from the owner of application server device 38 may not be trustworthy.

The techniques of this disclosure may assist in identifying whether applications that are to be executed on GPU 14 (e.g., application 20) are problematic applications such as malicious applications, as well as inefficient and error-prone applications, prior to execution. For example, the techniques of this disclosure may validate application 20 prior to GPU 14 executing application 20. Validation of application 20 may mean that the application 20 satisfies one or more performance criteria. For example, validation may mean determining with some level of assurance that application 20 is not a malicious application, an inefficient application, or an error-prone application. The example techniques described in this disclosure may transmit an indication to device 12 that indicates whether it is safe or inadvisable for GPU 14 to execute application 20. Processor 16 may then elect to instruct GPU 14 to execute application 20 based on the received indication.

For example, processor 16 may instruct GPU 14 to execute application 20 if the indication is favorable, i.e., indicates that the program is not malicious, not inefficient, and/or not error-prone. In some examples, processor 16 may instruct GPU 14 to execute application 20 even if the indication is unfavorable. For example, if application 20 is not malicious or error-prone, but inefficient, processor 16 may instruct GPU 14 to execute application 20 as such execution may potentially not harm GPU 14 or device 12, but may not execute as efficiently as possible.

In some examples, the techniques of this disclosure may also tune, or otherwise optimize, an inefficient application that is to be executed on GPU 14. For example, the developer of application 20 may not have any malicious intent, and may have developed application 20 such that application 20 is not prone to errors. Nevertheless, it may be possible that application 20 may not efficiently utilize the resources of GPU 14.

As one example, one of the functions of application 20 may be to divide a task into workgroups and perform parallel processing on the workgroups to exploit the parallelism of GPU 14. For example, application 20 may divide an image into blocks and perform parallel processing on the blocks. The size of each of blocks may be based on the amount of local memory available on GPU 14.

Because the developer of application 20 may want to design application 20 to execute on a variety of different GPUs, the developer may not know ahead of time how much local memory is available on a particular GPU, such as GPU 14, as different GPUs may include different amounts of local memory. To address this, the developer may develop application 20 to utilize variable sized blocks. In some instances, utilizing variable sized blocks may be less efficient than utilizing fixed sized blocks. The techniques of this disclosure may tune or optimize application 20 such that application 20 utilizes fixed sized blocks based on the amount of available memory in GPU 14.

As another example, application 20 may perform matrix operations. The developer of application 20 may have developed application 20 to perform row-based matrix operations or column-based matrix operation. In some instances, GPU 14 may be better suited to perform row-based matrix operations, as compared to column-based matrix operations, or vice-versa. In this example, the techniques of this disclosure may modify application 20 to perform row-based matrix operations, if application 20 uses column-based matrix operations, to more efficiently utilize GPU 14.

As yet another example, the developer may have developed application 20 for older versions of GPUs, and application 20 may not be optimized for GPU 14. The techniques of this disclosure may modify application 20 so that application 20 is more optimized for newer GPUs, such as GPU 14. GPU 14 may then execute application 20, which is optimized to execute on newer GPUs.

In accordance with techniques of this disclosure, validation server device 24 may validate application 20, and in some examples, optimize or tune application 20. To validate application 20, validation server device 24 may implement a validation process that determines whether application 20 satisfies one or more performance criteria. For example, validation server device 24 may determine, with some reasonable level of assurance, whether application 20 is a malicious application, an error-prone application, or an inefficient application. In examples where application 20 is an error-prone application or an inefficient application, validation server device 24 may attempt to correct the errors in application 20, or optimize application 20 to be more efficient.

It may be generally difficult to absolutely guarantee that application 20 is not a problematic application because it may be difficult to test all of the various ways in which application 20 may affect GPU 14 and device 12. Although an absolute guarantee that application 20 is not a problematic application may be difficult, validation server device 24 may employ different types of analysis to ensure with some reasonable amount of certainty that application 20 is not a problematic application.

As illustrated in FIG. 1, validation server device 24 is external to device 12. Accordingly, the validation of application 20 and optimization of application 20 may be offloaded from device 12, which may be referred to as validating application 20 in the "cloud" because validation server device 24 is a server that is external to device 12. By offloading the validation of application 20 to validation server device 24, the probability of application 20 negatively impacting GPU 14 and device 12 may be reduced, in cases where application 20 is a malicious application or an error-prone application. Also, by offloading the optimization of application 20 to validation server device 24, power savings and processing efficiency may be realized because processor 16 does not need to consume power and clock cycles validating or optimizing application 20.

There may be various examples of performance criteria that application 20 may need to satisfy for validation server device 24 to validate application 20. In general, the performance criteria can be part of static analysis, dynamic analysis, or a combination thereof. Static analysis refers to analysis of application 20 that can be performed without execution of application 20 to ensure that application 20 satisfies one or more performance criteria associated with static analysis. Dynamic analysis refers to analysis of application 20 during execution to ensure that application 20 satisfies one or more performance criteria associated with dynamic analysis.

Validation server device 24 may be operable to perform static analysis, dynamic analysis, or both static analysis and dynamic analysis. For purposes of illustration, validation server device 24 is described as being operable to perform both static analysis and dynamic analysis, and therefore, operable to ensure that application 20 satisfies the performance criteria associated with both static analysis and dynamic analysis. In alternate examples, validation server device 24 may be operable to perform one of static analysis or dynamic analysis, and in these alternate examples, validation server device 24 may be operable to ensure that application 20 satisfies the performance criteria associated with the type of analysis that validation server device 24 is operable to perform (e.g., performance criteria associated with static analysis or dynamic analysis).

As illustrated in FIG. 1, validation server device 24 includes emulator unit 26 and server memory 28. Server memory 28 may include data and/or instructions defining one or more GPU models 30, one or more GPU inputs 32, and one or more device models 34. Emulator unit 26 may be a processing unit that is operable to execute one or more of GPU models 30 and device models 34. As another example, emulator unit 26 may be a hardware emulation board, which may be a GPU. In some examples, emulator unit 26 may include two portions, which may be part of the same circuitry or separate, distinct circuits, where the first portion is a processing unit that is operable to execute one or more of GPU models 30 and device models 34, and the second portion that is the hardware emulation board (e.g., a GPU). Examples of emulator unit 26 include, but are not limited to, a DSP, a general purpose microprocessor, an ASIC, a FPGA, or other equivalent integrated or discrete logic circuitry.

Server memory 28 may be similar to device memory 18. For instance, server memory 18 may be any medium that can be used to store desired program code in the form of instructions, data, and/or data structures and that can be accessed by emulator unit 26 and that cause emulator unit 26 to perform one or more the functions ascribed to emulator unit 26. Similar to device memory 18, server memory 28 may, in some examples, be considered as a non-transitory storage medium, as described above with respect to device memory 18.

As illustrated, server memory 28 may store data and/or instructions defining one or more GPU models 30, GPU inputs 32, and device models 34. It may not be necessary for server memory 28 to store one or more GPU models 30, GPU inputs 32, and device models 34 in every example. For example, server memory 28 may store GPU models 30 and GPU inputs 32, but may not store device models 34. If validation server device 24 is operable to perform only static analysis, GPU models 30, GPU inputs 32, and device models 34 may not be needed. In some examples, it is with the GPU models 30, GPU inputs 32, and device models 34 that emulator unit 26 performs dynamic analysis.

Each of the one or more GPU models 30 may correspond to a particular GPU type, and each of the one or more device models 34 may correspond to a particular device type. For instance, each one of the GPU models 30 may model the configuration of its corresponding GPU type in terms of parallel processing capabilities, local memory availability, and any other pertinent characteristic that defines the functionality of GPUs of that GPU type. Each one of the device models 34 may model the configuration of its corresponding device type in terms of memory configuration, processor speed, system bus speed, device memory, and any other pertinent characteristics that defines the functionality of devices of that device type. For examples, different vendors provide different types of devices with different functional characteristics, and device models 34 may be models for each of these different device types.

The one or more GPU models 30 and device models 34 may each be considered as virtual model software that emulator unit 26 can execute. For example, when emulator unit 26 executes one of the GPU models 30, emulator unit 26 emulates the GPU to which the executed GPU model 30 corresponds. When emulator unit 26 executes one of the GPU models 30 and one of the device models 34, emulator unit 26 emulates the device to which the executed device model 34 corresponds, as if such a device included the GPU to which the executed GPU model 30 corresponds. In some examples, the GPU vendors and the device vendors may supply GPU models 30 and device models 34, respectively. There may be other ways in which server memory 28 stores GPU models 30 and device models 34, and aspects of this disclosure are not limited to the specific examples where vendors provide GPU models 30 and device models 34.

For example, when emulator unit 26 executes one of GPU models 30, emulator unit 26 may function as if the parallel processing capabilities and local memory availability of emulator unit 26 (as two examples) are functionally equivalent to the GPU type associated with executed one of GPU models 30. Similarly, when emulator unit 26 executes one of device models 34, emulator unit 26 may function as if the memory configuration, processor speed, system bus speed, and device memory of emulator unit 26 (as four examples) are functionally equivalent to the device type associated with executed one of device models 34. In other words, the execution of one of GPU models 30 causes emulator unit 26 to function as the GPU associated with the executed one of GPU models 30. The execution of one of GPU models 30 and one of device models 34 causes emulator unit 26 to function as a device associate with the executed one of device models 34 that includes the GPU associated with the executed one of GPU models 30.

One of the plurality of GPU models 30 may be a generic GPU model 30, and one of the plurality of device models 34 may be generic device model 34. In some examples, server memory 28 may store a generic GPU model and a generic device model instead of a plurality of GPU models and device models. The generic GPU model and device model may not correspond to a particular GPU or device type, but may be suitable for static and dynamic analysis. In some examples, if server memory 28 does not store a GPU model that corresponds to GPU 14, then the generic GPU model may be suitable for validation purposes. The generic GPU model and the generic device model may conform to a base profile of operation common to most GPUs or devices.

There may be various types of GPUs and devices that may be modeled by the generic GPU and generic device models. As one example, the generic GPU model may model a GPU with average parallel processing capabilities and local memory availability as compared to other GPUs. The generic device model may model a device with average memory configuration, processor speed, system bus speed, and device memory as compared to other devices.

As an illustrative example for validating and/or optimize application 20 for execution on GPU 14, device 12 may download application 20 from application server device 38. Application 20 may be source code, an intermediate representation, or pre-compiled object code, as described above.

Processor 16 may then install application 20 on device 12. If application 20 is in source code or in the intermediate representation, e.g., not pre-compiled object code, part of the installation may be processor 16 executing a compiler to compile the code of application 20.

In some examples, where the downloaded code of application 20 is source code or the intermediate representation, prior to compiling, processor 16 may cause device 12 to transmit the downloaded code of application 20 to validation server device 24 for validation. In some examples, where the downloaded code of application 20 is pre-compiled object code, processor 16 may cause device 12 to transmit the pre-compiled object code to validation server device 24 for validation before allowing GPU 14 to execute application 20.

For security purposes, processor 16 may encrypt or otherwise make secure the downloaded code of application 20 that device 12 transmits to validation server device 24. In some examples, processor 16 may require authorization from a user prior to transmitting the downloaded code of application 20 to validation server device 24. Furthermore, in some examples of dynamic analysis, processor 16 may cause device 12 to transmit the GPU type of GPU 14 or both the GPU type of GPU 14 and the device type of device 12 to validation server device 24. In some of these instances, processor 16 may require authorization from the user prior to transmitting the GPU type of GPU 14 or the GPU type of GPU 14 and device type of device 12 to validation server device 24.

Emulator unit 26 may be operable to perform static analysis on application 20 to determine whether application 20 satisfies the performance criteria associated with static analysis. For example, emulator unit 26 may analyze application 20 without executing application 20. As one example, emulator unit 26 may parse through the downloaded code of application 20 to identify code known to be code for a virus. For instance, server memory 28 may store code of known viruses, and emulator unit 26 may compare the downloaded code of application 20 to the code of the known viruses. Determining that the downloaded code of application 20 does not include code of known viruses may be one example of performance criteria that needs to be satisfied to validate application 20.

As part of the static analysis, emulator unit 26 may compile the downloaded code of application 20, in examples where the downloaded code of application 20 is the source code or intermediate representation of application 20, to identify errors in application 20 during compilation. For example, emulator unit 26 may execute compiler 36, as indicated by dashed lines within emulator unit 26. The compilation of application 20, with compiler 36, may identify any infinite loops in application 20 or out-of-bounds access to memory array locations within application 20. In this example, determining that there are not errors in application 20, that can be found during compilation, may be another example of performance criteria that needs to be satisfied to validate application 20.

Static analysis may be limited in the types of errors, inefficiencies, and malicious code that can be found. For example, if the downloaded code of application 20 is pre-compiled object code, it may not be possible for emulator unit 26 to identify errors in application 20 during compilation because the code for application 20 is already pre-compiled object code. As another example, if application 20 relies on pointers for storage, it may not be possible to determine if there are any out-of-bounds memory access errors in application 20 based simply on compiling application 20.

To further determine whether application 20 is problematic (e.g., inefficient, error-prone, or malicious), emulator unit 26 may perform dynamic analysis. As indicated above, dynamic analysis refers to analysis of application 20 during execution. In some examples, to perform dynamic analysis emulator unit 26 may cause itself to appear as if it is GPU 14. For example, in some instances, in addition to transmitting the downloaded code of application 20, processor 16 may cause device 12 to transmit the GPU type of GPU 14 to emulator unit 26 of validation server device 24, or both the GPU type of GPU 14 and the device type of device 12 to emulator unit 26 of validation server device 24 via network 22. Emulator unit 26, in turn, may identify which one of GPU models 30 corresponds to the GPU type of GPU 14, and may execute that one of GPU models 30 to emulate GPU 14 on validation server device 24. In examples where emulator unit 26 also receives the device type, emulator unit 26 may identify which one of device models 34 corresponds to the device type of device 12, and may execute that one of device models 34 to emulate device 12 on validation server device 24.

In examples where device 12 does not transmit the GPU type of GPU 14 and/or the device type of device 12, emulator unit 26 may execute the generic GPU model and/or the generic device model. Alternatively, if device 12 does transmit the GPU type of GPU 14 and/or the device type of device 12, but none of GPU models 30 and device models 34 correspond to the GPU and device type, emulator unit 26 may execute the generic GPU model and/or generic device model. In examples where emulator unit 26 is or includes a hardware emulation board, such a hardware emulation board may be designed to function, at least in part, as a generic GPU on a generic device.

Once emulator unit 26 emulates itself to be GPU 14, or to be GPU 14 as part of device 12, emulator unit 26 may execute application 20. For example, if emulator unit 26 received the source code or intermediate code of application 20, emulator unit 26 may compile the source code via compiler 36, and execute the resulting object code. If emulator unit 26 received pre-compiled object code of application 20, emulator unit 26 may execute the pre-compiled object code of application 20.

The techniques of this disclosure may be considered, in some examples, as being performed at least in part by emulator unit 26 executing a virtual model based on the type of GPU 14 (e.g., one of GPU models 30). Then, when emulator unit 26 executes application 20, application 20 can be considered as executing in the virtual model (e.g., the one of GPU models 30 that is executing on emulator unit 26). For example, both the GPU model, of GPU models 30, that corresponds to GPU 14 and application 20 are executing on emulator unit 26. In the techniques of this disclosure, because emulator unit 26 functions as if it is GPU 14, due to the execution of the GPU model that corresponds to GPU 14, when emulator unit 26 executes application 20, application 20 may execute on the GPU model that corresponds to GPU 14.

As part of the dynamic analysis, emulator unit 26 may receive hypothetical input values for application 20 that is executing on emulator unit 26. As illustrated, server memory 28 may store one or more GPU inputs 32. These one or more GPU inputs 32 may be values for different graphical images or objects. In some examples, each of these different images may be of different sizes. In examples where application 20 is not related to graphics processing, GPU inputs 32 may be non-graphics inputs. It may be difficult to ensure that emulator unit 26 tests every permutation and combination of possible input values. Accordingly, server memory 28 may store a sufficient number and/or range of GPU inputs 32, e.g., as samples or test inputs, to provide some reasonable level of assurance that application 20 is not a malicious or highly error-prone application (e.g., a problematic application). The GPU inputs 32 may include different types of images or objects to be processed and rendered by GPU 14.

During execution of application 20, emulator unit 26 may input the values of GPU inputs 32 and may analyze functionality of the executed GPU model of GPU models 30. In examples, where emulator unit 26 is a hardware emulation board, emulator unit 26 may analyze the functionality of the hardware emulation board. For example, emulator unit 26 may monitor memory accesses by the executed GPU model of GPU models 30. In this example, emulator unit 26 may determine whether any of the memory accesses by the executed GPU model of GPU models 30 are out-of-bounds memory accesses of server memory 28. As another example, emulator unit 26 may monitor the memory addresses where the execute GPU model of GPU models 30 is writing information in server memory 28. Based on the memory accesses of the GPU model and the memory addresses where the GPU model is writing information, emulator unit 26 may be able to determine whether application 20 is error-prone. Such memory tracking may be particularly useful when application 20 reads or writes to variables using pointers.

For example, if the executed GPU model writes information to or reads information from out-of-bounds memory locations, emulator unit 26 may determine that application 20 is error-prone, and possibly malicious. For example, if the executed GPU model writes information to or reads information from a non-existent memory location, emulator unit 26 may determine that application 20 is error-prone. If the executed GPU model writes information to a memory location that is not reserved for the GPU model, emulator unit 26 may determine that application 20 is error-prone or possibly malicious. For example, emulator unit 26 may determine that application 20 is attempting to load a virus into the memory locations which application 20 should not be able to access.

The limitations of where application 20 can write information to or read information from (e.g., access) during execution may be an example of performance criteria associated with dynamic analysis. For example, the performance criteria may be a limitation of the memory locations that application 20 is allowed to access. If the GPU model of GPU models 30 accesses memory location outside of the limited memory locations, due to the execution of application 20, application 20 may be in violation of the performance criteria. For example, there may be threshold number of access outside the limited memory locations that is allowable, in accordance with the performance criteria. The threshold number may be zero to provide a highest level of assurance that application 20 is not attempting to access memory locations outside of the limited memory locations.

In examples where emulator unit 26 also executes one of device models 34, emulator unit 26 may similarly analyze functionality of the executed device model of device models 34. For example, emulator unit 26 may monitor the functions performed by the executed one of device models 34 while emulator unit 26 executes one of GPU models 30. For example, the execution of one of device models 34 may result in emulator unit 26 device 12 which includes a system bus. Emulator unit 26 may determine whether the execution of application 20 causes the system bus to overload resulting in device 12 slowing down.

The monitoring of the system bus to determine whether the system bus is being overloaded may be an example of performance criteria associated with dynamic analysis. For example, if the execution of application 20 causes the system bus to overload, application 20 may be in violation of the performance criteria. In this example, the performance criteria may allow for some level of overloading the system bus, as it may not be possible to not allow any overloading of the system bus. For example, the perform criteria may establish a percentage amount threshold of system bus overload. If the system bus overload is below the allowable percentage, the performance criteria is satisfied. Otherwise, the performance criteria is not satisfied.

Emulator unit 26 may similarly detect malicious applications such as denial of service attacks. For example, emulator unit 26 may monitor the rate at which the GPU model of GPU models 30 is able to execute application 20. If emulator unit 26 detects slow responsiveness, unintended termination, or hanging, emulator unit 26 may determine application 20 is an application designed for a denial of service attack, or a very poorly designed application. In this example, the performance criteria may be a threshold execution time or execution rate for a particular task of application 20. If application 20 takes longer than the threshold execution time to complete a particular task or executes the task at a rate less than the threshold execution rate, application 20 may be in violation of the performance criteria.

As another example of emulator unit 26 detecting malicious applications or error-prone applications, emulator unit 26 may monitor instructions issued by application 20. For instance, in some examples, instructions issued by application 20 may be 96-bit words. However, not all combinations of 96 bits represents a valid instruction. In some examples, GPU 14 may be designed to ignore invalid instructions; however, this may not be case for every example of GPU 14. To avoid GPU 14 from inadvertently executing an invalid instruction, emulator unit 26 may determine whether the instructions issued by application 20 during execution are valid or invalid instructions. If emulator unit 26 determines that application 20 is issuing invalid instructions, emulator unit 26 may determine that application 20 is a malicious application, an error-prone application, or an inefficient application.

As another example, during execution, application 20 may write data to and read data from registers. A malicious application, error-prone application, or inefficient application may read data from unwritten registers. If application 20 attempts to read data from a register that was not previously written to, the data read by application 20 may be meaningless data (i.e., uninitialized data). Such reading of uninitialized data may result in unpredictable behavior. In some examples, emulator unit 26 may monitor which registers application 20 writes to during execution, and may determine whether application 20 is reading from a register that has not previously been written to. If emulator unit 26 determines that application 20 is reading from unwritten registers, emulator unit 26 may determine that application 20 is a malicious application, error-prone application, or an inefficient application.

If emulator unit 26 determines that the performance criteria associated with static analysis and dynamic analysis are met, validation server device 24 may transmit an indication to device 12 indicating that application 20, with some level of assurance, satisfies one or more performance criteria associated with static analysis, dynamic analysis, or both static and dynamic analysis (e.g., validates application 20). In this case, validation server device 24 may provide an indication that application 20 is validated for use by GPU 14. Otherwise, in some examples, validation server device 24 may transmit an indication to device 12 indicating that application 20 is invalidated for use by GPU 14, such that it is inadvisable for GPU 14 to execute application 20. In response, processor 16 may instruct GPU 14 to execute application 20 based on the received indication.

In examples where validation server device 24 received source code or intermediate code of application 20, emulator unit 26 may also transmit the compiled object code of application 20, as compiled by compiler 36. In this way, the compilation of application 20 may also be offloaded from device 12 and offloaded to an external device, such as validation server device 24.

Validation server device 24 may also be tasked with optimizing or tuning application 20. For example, emulator unit 26 may receive the source code or intermediate code of application 20. As part of the static and/or dynamic analysis, emulator unit 26 may determine that application 20 is somewhat error-prone or would inefficiently utilize the capabilities of GPU 14. In these examples, rather than transmitting an indication to device 12 indicating that it is inadvisable for GPU 14 to execute application 20, emulator unit 26 may attempt to correct the errors of application 20 or attempt to tune application 20 for GPU 14 when it is determined that application 20 may execute inefficiently or with errors on GPU 14.

If emulator unit 26 is able to correct the errors or make application 20 more efficient, emulator unit 26 may compile the modified code of application 20 to generate object code that GPU 14 should execute. Emulator unit 26 may then transmit the resulting object code to device 12 with an indication that GPU 14 should execute the resulting object code. In this case, GPU 14 may execute the object code generated from the modified code, rather than the object code generated from the original code of application 20. Alternatively, emulator unit 26 may transmit the modified code of application 20 without compilation.

In either of these examples, the validation of application 20 may be considered as being part of the transmission of the modified code of application 20 (e.g., the transmission of the modified code or the resulting object code). For example, when device 12 receives modified code of application 20 from validation server device 24, device 12 may automatically determine that the modified code of application 20 is suitable for execution because device 12 received the modified code of application 20 from validation server device 24. In this sense, the validation that device 12 receives from validation server device 24 may be an explicit validation or an implicit validation. In either case, i.e., explicit or implicit validation, emulator unit 26 may determine with some level of assurance that application 20 or the modified version of application 20 satisfies one or more performance criteria.

If emulator unit 26 is unable to correct the errors of application 20, emulator unit 26 may transmit the indication indicating that it is inadvisable to execute application 20 on GPU 14. If emulator unit 26 is unable to make application 20 more efficient, emulator unit 26 may still transmit an indication to device 12 indicating that it may be suitable for GPU 14 to execute application 20 because while application 20 may not be completely efficient, application 20 may not be error-prone or malicious.

To tune or optimize application 20, emulator unit 26 may insert code (e.g., source code or intermediate code), replace code, or modify code of application 20 in some other manner. In some examples, emulator unit 26 may collect statistics to determine how well the compiled code of application 20 works. For example, application 20 may utilize array indices for storing variable values in an array. Emulator unit 26 may add code into the source code of application 20 that checks that array indices, utilized by application 20, are within the range. Emulator unit 26 may add code into the source code of application 20 that causes application 20 to abort when an array index is not within range. Emulator unit 26 then may compile the modified source code to produce object code for execution of application 20 by GPU 14.

Optimization or tuning may be based on the assumption that applications, such as application 20, are generally developed to exploit the high level of parallelism of GPU 14. If the developer did not intend to exploit the parallelism of GPU 14, the developer would have developed application 20 to not execute on GPU 14, and rather execute on processor 16.

For example, the developer of application 20 may have developed application 20 to perform image processing on blocks of images in parallel. As described above, the size of the blocks of the images may be based on the amount of available local memory on GPU 14. Because the developer may not know how much memory is available on GPU 14, the developer may develop application 20 to use variable-sized blocks, instead of the more efficient fixed sized blocks. For example, fixed-size blocks may be more efficient because the size of the blocks does not change during execution.

In some examples, emulator unit 26 may determine the optimal size for the blocks because the GPU model of GPU models 30 that corresponds to GPU 14 may include information that indicates the size of the local memory of GPU 14. In this example, emulator unit 26 may select the optimal size for the blocks based on the amount of available local memory on GPU 14, the amount of data that will be needed to write to or read from the local memory of GPU 14, and other such information which may not be available to developer of application 20. In aspects of this disclosure, emulator unit 26 would know how much local memory is available and how much data needs to be written or read from local memory because emulator unit 26 may execute application 20 on the GPU model of GPU models 30 that correspond to GPU 14.

In these examples, emulator unit 26 may update or otherwise modify the source code or intermediate code of application 20 to fix block size to the optimally determined size. In other words, emulator unit 26 may determine the optimal size of the blocks to best utilize the parallelism of GPU 14. Emulator unit 26 may then compile this modified code of application 20, and transmit the resulting object code to device 12 for execution on GPU 14. In this way, when GPU 14 executes the modified application 20, the modified application 20 may execute more efficiently on GPU 14, as compared to the original application 20.

In another example for optimization, as described above, application 20 may perform matrix operations. In this example, emulator unit 26 may determine whether column-based matrix operations or row-based matrix operations are handled easier by GPU 14. For instance, emulator unit 26 may cause the GPU model of GPU models 30 that corresponds to GPU 14 to execute application 20 using row-based matrix operations and using column-based matrix operations. Emulator unit 26 may compare the efficiency of the column-based and row-based matrix operations (e.g., number of accesses to memory, amount of processing time, and other such efficiency measures). Based on the measured efficiency, emulator unit 26 may modify the code of application 20. For example, if column-based operations are more efficiently executed than row-based operations, emulator unit 26 may modify the code of application 20 so that the matrix operations are performed as column-based operations. Similarly, if row-based operations are more efficiently executed than column-based operations, emulator unit 26 may modify the code of application 20 so that the matrix operations are performed as row-based operations.

In another example for optimization, as described above, the developer of application 20 may have developed application 20 to be executed on older versions of GPU. In this case, application 20 may properly execute on a GPU such as GPU 14; however, application 20 may not fully exploit the functionality of GPU 14. For example, application 20 may unnecessarily limit the amount of graphics or non-graphics data that GPU 14 should process in parallel because older versions of GPUs may be limited in processing capabilities. In this example, emulator unit 26 may modify the code of application 20 such that, when application 20 is executed, application 20 causes GPU 14 to process more data in parallel. There may be other examples of ways in which emulator unit 26 may modify application 20 such that application 20 is better suited for execution on newer GPUs, and aspects of this disclosure should not be considered limited to the above examples.

After optimizing application 20, emulator unit 26 may transmit the modified or updated code of application 20 to device 12. In this example, processor 16 may compile the code of application 20, as received from emulator unit 26, and instruct GPU 14 to execute the resulting object code. In some other examples, emulator unit 26 may compile the modified application 20, via compiler 36, and transmit the resulting object code to device 12. In this example, processor 16 may instruct GPU 14 to execute the received object code for application 20.

In some examples, emulator unit 26 may validate application 20 and optimize or tune application 20 once. After such validation, GPU 14 may execute application 20 as needed without requiring further validation or optimization. Also, in some examples, after emulator unit 26 validates application 20, emulator unit 26 may store an indication in server memory 28 that indicates that this application 20 has already been validated. In these examples, when emulator unit 26 receives code for validation, emulator unit 26 may first determine whether emulator unit 26 previously validated the code based on the indication stored in server memory 28. If emulator unit 26 previously validated the code, emulator unit 26 may immediately valid that received code. For example, emulator unit 26 may validate application 20, as received from device 12. Subsequently, emulator unit 26 may receive code for application 20 from a device other than device 12. In this case, emulator unit 26 may first determine that the received code is same as the code that emulator unit 26 previously validated, and if so, may immediately validate the received code. In this manner, emulator unit 26 may not need to perform the static and/or dynamic analysis again for previously validated code.

Figure 2:
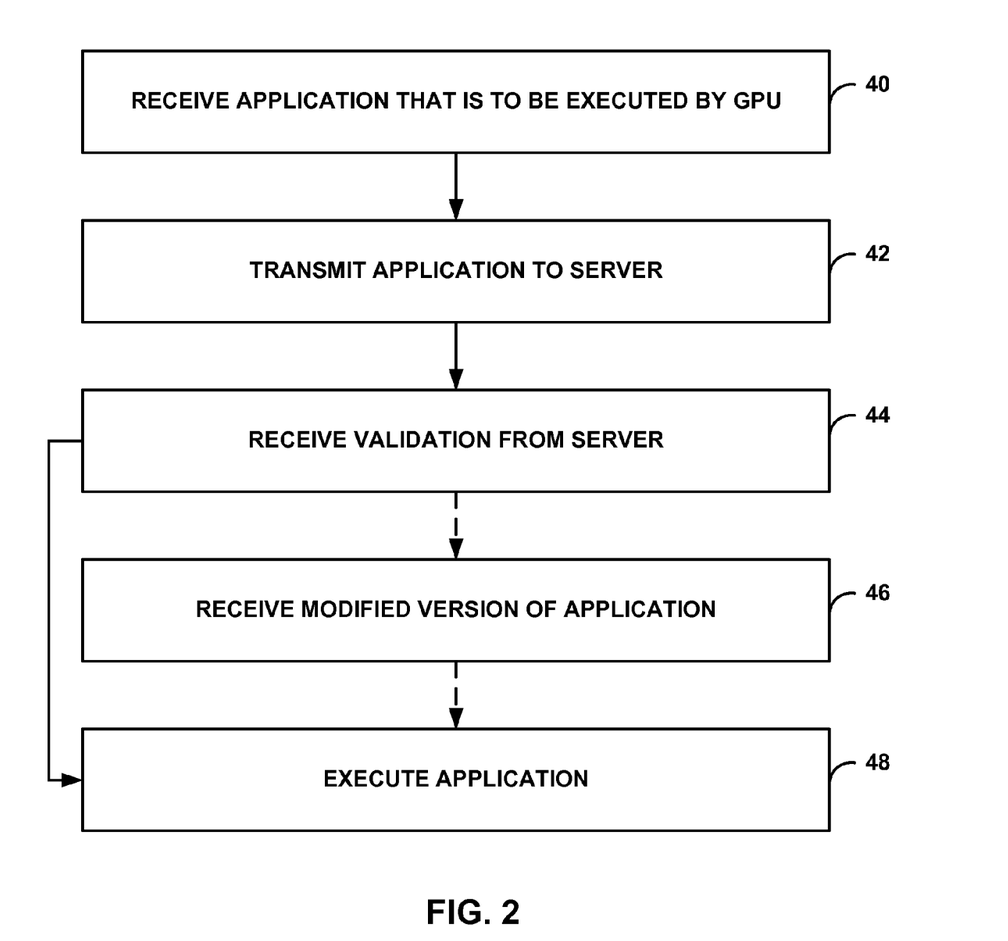
FIG. 2 is a flowchart illustrating an example operation of a device that may be operable to implement one or more aspects of this disclosure.

FIG. 2 is a flowchart illustrating an example operation of device 12. For purposes of illustration only, reference is made to FIG. 1. Device 12 may receive application 20 that is to be executed by GPU 14 (40). For example, device 12 may download application 20 from application server device 38. As another example, application 20 may be preloaded on device memory 18. As described above, device 12 may receive the source code, intermediate code (e.g., intermediate representation of application 20), or object code of application 20.

Device 12 may transmit the code of application 20 to validation server device 24 (42). For example, device 12 may transmit the source code, intermediate code, or object code of application 20 to validation server device 24 for validation of application 20. In some examples, device 12 may transmit the code of application 20 to validation server device 24 once for validation. GPU 14, of device 12, may then execute application 20 as needed without requiring subsequent validation.

In response to transmitting the code of application 20 to validation server device 24 for validation, device 12 may receive the validation from validation server device 24 (44). Alternatively, device 12 may receive an invalidation or either a validation or an invalidation. The validation from server device 24 may indicate that application 20 satisfies one or more performance criteria. If application 20 does not satisfy the one or more performance criteria, validation server device 24 may indicate that application 20 did not satisfy the performance criteria. For example, the validation may indicate that application 20 satisfies performance criteria associated with static analysis, dynamic analysis, or both static and dynamic analysis. In some examples, validation server device 24 may optimize or tune application 20 to make application 20 more efficient or less error-prone. In this case, the validation may indicate that the modified version of application 20 satisfies one or more performance criteria.

In some examples, processor 16 of device 12 may instruct GPU 14 of device 12 to execute application 20 based on the validation (48). For example, if validation server device 24 indicates that application 20 satisfies the performance criteria, processor 16 may instruct GPU 14 to execute application 20. Otherwise, processor 16 may not allow GPU 14 to execute application 20.

In some alternate examples, prior to execution, device 12 may receive a modified version of application 20 (46). In FIG. 2, the dashed line from block 44 to block 46, and from block 46 to block 48 is used to indicate that the functions of block 46 may not be necessary in every example. For instance, validation server device 24 may be able to optimize or tune application 20, and may transmit the modified version of application 20. As another example, device 12 may transmit the source code or intermediate code of application 20, and receive a compiled version of application 20 from validation server device 24. As yet another example, device 12 may receive a compiled version of the code as modified by validation server device 24 (e.g., modified for optimization or tuning). In these examples, processor 16 may instruct GPU 14 to execute the modified version of application 20 (48).

Figure 3:
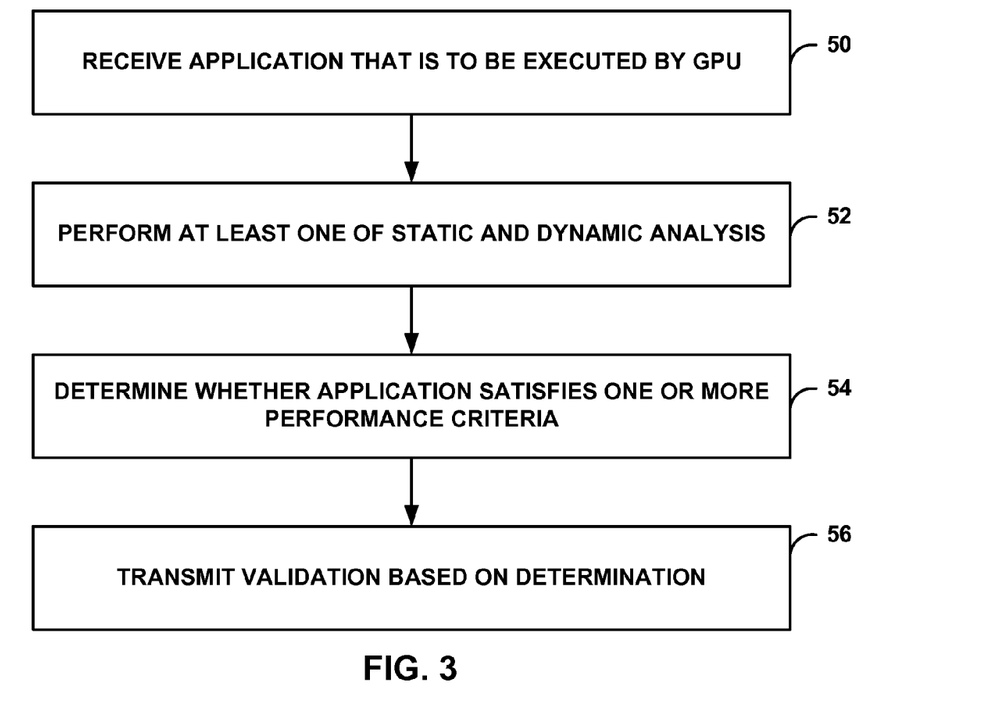
FIG. 3 is a flowchart illustrating an example operation of a server that may be operable to implement one or more aspects of this disclosure.

FIG. 3 is a flowchart illustrating an example operation of validation server device 24. For purposes of illustration only, reference is made to FIG. 1. Validation server device 24 may receive application 20, which is to be executed by GPU 14, from device 12 (50). For example, validation server device 24 may receive source code, intermediate code, or object code of application 20 from device 12 via network 22.

Validation server device 24 may perform at least one of static analysis and dynamic analysis on application 20 (52). For example, as part of static analysis, emulator unit 26 of validation server device 24 may compile the code of application 20, and monitor for any errors during the compilation of application 20. As part of the dynamic analysis, emulator unit 26 of validation server device 24 may execute a virtual model of GPU 14 or the virtual model of GPU 14 and a virtual model of device 12. As described above, GPU models 30 and device models 34 may include a virtual model of GPU 14 and device 12, respectively. In some examples, GPU models 30 and device models 34 may include a generic GPU model and a generic device model.

For example, emulator unit 26 may receive an identification of GPU 14 and/or device 12 from device 12. Emulator unit 26 may identify which one of GPU models 30 corresponds to GPU 14 and which one of device models 34 corresponds to device 12, and execute the corresponding GPU and device models. If there is no corresponding GPU and/or device models for GPU 14 and device 12, or if emulator unit 26 did not receive an identification of GPU 14 and/or device 12, emulator unit 26 may execute the generic GPU and device models.

As part of the dynamic analysis, emulator unit 26 may execute application 20 and input application 20 with GPU inputs 32 for analyzing application 20. In these examples, application 20 may be considered as executing on the corresponding virtual model of GPU 14, which is executing on emulator unit 26. In this way, emulator unit 26 may execute application 20, as if application 20 is executing on GPU 14. Emulator unit 26 may monitor the functions performed by the corresponding virtual model of GPU 14 such as memory accesses, rate of execution, termination instance, and other functions pertinent to the functionality of GPU 14.

Emulator unit 26 may determine whether application 20 satisfies one or more performance criteria (54). The one or more performance criteria may be performance criteria associated with static analysis and performance criteria associated with dynamic analysis. For example, the one or more performance criteria may be criteria that there are no errors in the compilation of application 20, as evaluated by compiling application 20 during the static analysis. As another example, the one or more performance criteria may be criteria that application 20 not access out-of-bounds memory locations and not use up resources of GPU 14 such that GPU 14 is not able to perform other tasks in parallel, as evaluated by executing application 20 and providing application 20 with GPU inputs 32 during the dynamic analysis. There may be other examples of performance criteria that emulator unit 26 may determine that application 20 satisfies.

Validation server device 24 may transmit a validation of application 20 to device 12 based on the determination (56). For example, validation server device 24 may transmit a validation of application 20 to device 12 if application 20 satisfies the one or more performance criteria. Otherwise, validation server device 24 may transmit an invalidation if application 20 does not satisfy the one or more performance criteria. For example, if emulator unit 26 determines that application 20 satisfies the one or more performance criteria, validation server device 24 may transmit an indication to device 12 indicating as such. Alternatively, if emulator unit 26 determines that application 20 does not satisfy the one or more performance criteria, validation server device 24 may transmit an indication to device 12 indicating as such.

Figure 4:
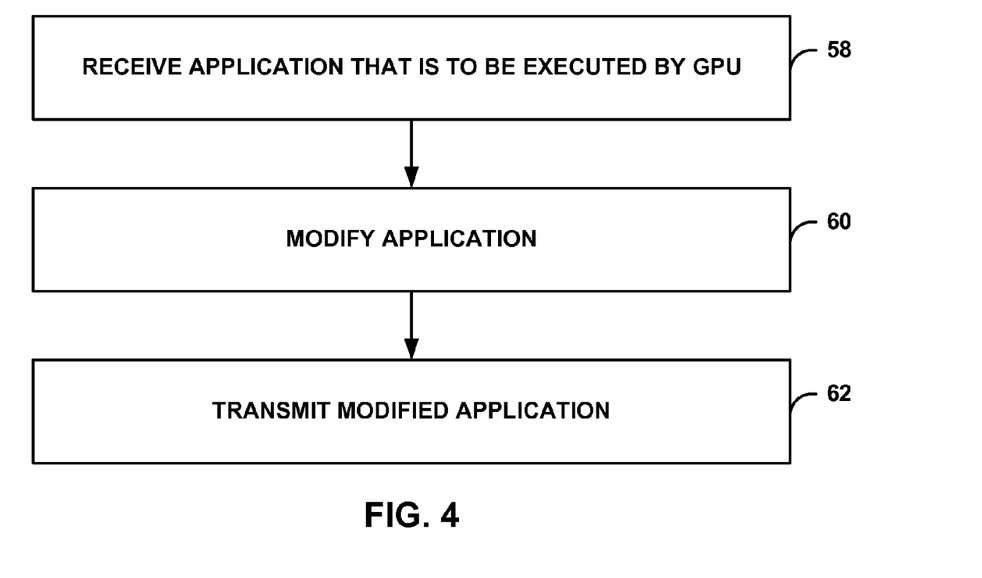
FIG. 4. is a flowchart illustrating another example operation of a server that may be operable to implement one or more aspects of this disclosure.

FIG. 4 is a flowchart illustrating another example operation of validation server device 24. For purposes of illustration only, reference is made to FIGS. 1 and 3. Similar to FIG. 3, validation server device 24 may receive application 20, which is to be executed by GPU 14, from device 12 (58). In this example, emulator unit 26 may modify application 20 (e.g., the source code or intermediate code of application 20) to optimize or tune application 20. For example, emulator unit 26 may modify the code of application 20 so that application 20 executes more efficiently on GPU 14. Validation server device 24 may then transmit modified application 20 to device 12 (62). In some examples, validation server device 24 may transmit the source code or intermediate code of the modified application 20. As another example, validation server device 24 may compile the modified code of application, and transmit the resulting object code to device 12.

FIG. 5 is a block diagram illustrating the example device of FIG. 1 in further detail. For instance, FIG. 5 illustrates device 12 of FIG. 1 in further detail. For example, as indicated above, examples of device 12 include, but are not limited to, mobile wireless telephones, PDAs, video gaming consoles that include video displays, mobile video conferencing units, laptop computers, desktop computers, television set-top boxes, and the like.

As illustrated in FIG. 5, device 12 may include GPU 14, processor 16, device memory 18, transceiver module 64, user interface 66, display 68, and display processor 70. GPU 14, processor 16, and device memory 18 may be substantially similar or identical to those illustrated in FIG. 1. For purposes of brevity, only the components that are shown in FIG. 5, but not shown in FIG. 1 are described in detail.

Device 12 may include additional modules or units not shown in FIG. 5 for purposes of clarity. For example, device 12 may include a speaker and a microphone, neither of which are shown in FIG. 5, to effectuate telephonic communications in examples where device 12 is a mobile wireless telephone, or a speaker where device 12 is a media player. Furthermore, the various modules and units shown in device 12 may not be necessary in every example of device 12. For example, user interface 66 and display 68 may be external to device 12 in examples where device 12 is a desktop computer or other device that is equipped to interface with an external user interface or display.

Examples of user interface 66 include, but are not limited to, a trackball, a mouse, a keyboard, and other types of input devices. User interface 66 may also be a touch screen and may be incorporated as a part of display 68. Transceiver module 64 may include circuitry to allow wireless or wired communication between device 12 and another device or a network. Transceiver module 64 may include one or more modulators, demodulators, amplifiers, antennas and other such circuitry for wired or wireless communication. Display 68 may comprise a liquid crystal display (LCD), an organic light emitting diode display (OLED), a cathode ray tube (CRT) display, a plasma display, a polarized display, or another type of display device.

In some examples, after GPU 14 generates the graphics data for display on display 68, GPU 14 may output the resulting graphics data to device memory 18 for temporary storage. Display processor 70 may retrieve the graphics data from device memory 18, perform any post-processing on the graphics data, and output the resulting the graphics data to display 68. For example, display processor 70 may perform any further enhancements or scale the graphics data generated by GPU 14.

In one or more examples, the functions described may be implemented in hardware, software, firmware, or any combination thereof. If implemented in software, the functions may be stored as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. By way of example, and not limitation, such computer-readable media can comprise random access memory (RAM), read-only memory (ROM), EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (i.e., a chip set). Various components, modules or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   receiving, by a server device, an application that is to be executed by a graphics processing unit (GPU) that resides on a device external to the server device;
   determining, by the server device, that the application would execute inefficiently on the GPU;
   creating, by the server device and based on the determination that the application would execute inefficiently on the GPU, a modified version of the application that would execute more efficiently on the GPU than the received application;
   performing, by the server device an analysis of the modified version of the application during execution of the modified version of the application on the server device, wherein performing the analysis comprises:
   executing a virtual GPU model;
   executing the modified version of the application on the virtual GPU model; and
   monitoring functionality of the virtual GPU model during execution of the modified version of the application on the virtual GPU model;
   determining whether the modified version of the application satisfies one or more performance criteria based on the analysis; and
   transmitting, to the device, the modified code of the application and a validation of the application if the application satisfies the one or more performance criteria.

2. The method of claim 1, wherein the performance criteria comprises at least one of a determination that the application is absent of malicious code and a determination that the application is not error-prone.

3. The method of claim 1, wherein the performance criteria includes one or more of a determination that a code of the application does not include a code of known viruses, a determination that no errors are found as determined during compilation of the code of the application, a determination that there are no out-of-bounds memory accesses as determined during execution of the application, a determination that a system bus of the device is not overloaded as determined during execution of the application, a determination that a task of the application completes execution within a threshold execution time, and a determination that the task of the application executes at least at a threshold execution rate.

4. The method of claim 1, further comprising:
   performing an analysis of the application prior to and during compilation by at least comparing a code of the application with a code of known viruses, and determining whether any errors are found during compilation of the code of the application.

5. The method of claim 1, further comprising:
executing a virtual device model; and
monitoring functionality of the virtual device model during the execution of the application on the GPU model.

6. The method of claim 1, wherein executing the application on the virtual GPU model comprises inputting GPU inputs to the application executing on the virtual GPU model.

7. The method of claim 1, further comprising:
monitoring functions performed by the executed application.

8. The method of claim 7, wherein monitoring functions comprises one or more of monitoring memory accesses by the executed application, monitoring rate of execution, and monitoring execution time.

9. The method of claim 1, wherein receiving the application further comprises receiving an identification of the GPU that resides on the device external to the server device, the method further comprising:
identifying, based on the received identification of the GPU, a particular virtual GPU model of a plurality of virtual GPU models, wherein executing the virtual GPU model comprises executing the identified particular virtual GPU model, and wherein executing the modified version of the application on the virtual GPU model comprises executing the modified version of the application on the identified particular virtual GPU model.

10. The method of claim 9, wherein creating the modified version of the application further comprises modifying code of the application based on the received identification of the GPU.

11. The method of claim 1, further comprising:
executing the application on a hardware emulation board; and
monitoring functionality of the hardware emulation board during the execution,
wherein determining whether the application satisfies one or more performance criteria comprises determining whether the application satisfies one or more performance criteria based on at least one of the monitorings.

12. The method of claim 1, wherein receiving the application comprises receiving at least one of source code and intermediate code of the application, the method further comprising:
compiling at least one of the source code and the intermediate code of the application to generate object code of the application; and
transmitting the object code of the application to the device.

13. An apparatus comprising:
a memory;
an emulator unit configured to:
receive an application that is to be executed by a graphics processing unit (GPU) that resides on a device external to the apparatus;
determine that the application would execute inefficiently on the GPU;
create, based on the determination that the application would execute inefficiently on the GPU, a modified version of the application that would execute more efficiently on the GPU than the received application;
perform an analysis of the modified version of the application during execution of the modified version of the application on the apparatus, wherein, to perform the analysis of the modified version of the application during execution, the emulator unit is configured to:
execute a virtual GPU model stored in the memory;
execute the modified version of the application on the virtual GPU model; and
monitor functionality of the virtual GPU model during execute of the modified version of the application on the GPU model;
determine whether the modified version of the application satisfies one or more performance criteria based on the analysis; and
transmit, to the device, the modified code of the application and a validation of the application if the application satisfies the one or more performance criteria.

14. The apparatus of claim 13, wherein the performance criteria comprises at least one a determination that the application is absent of malicious code and a determination that the application is not error-prone.

15. The apparatus of claim 13, wherein the performance criteria includes one or more of a determination that a code of the application does not include a code of known viruses, a determination that no errors are found as determined during compilation of the code of the application, a determination that there are no out-of-bounds memory accesses as determined during execution of the application, a determination that a system bus of the device is not overloaded as determined during execution of the application, a determination that a task of the application completes execution within a threshold execution time, and a determination that the task of the application executes at least at a threshold execution rate.

16. The apparatus of claim 13, wherein the emulator unit is configured to perform an analysis of the application prior to and during compilation by at least comparing a code of the application with a code of known viruses, and determining whether any errors are found during compilation of the code of the application.

17. The apparatus of claim 13, wherein the emulator unit is further configured to:
execute a virtual device model stored in the memory; and
monitor functionality of the virtual device model during the execution of the application on the GPU model.

18. The apparatus of claim 13, wherein the emulator unit inputs GPU inputs stored in the memory to the modified version of the application executing on the virtual GPU model during the execution of the modified version of the application on the virtual GPU model.

19. The apparatus of 13, wherein the emulator unit is further configured to monitor functions performed by the executed modified version of the application.

20. The apparatus of claim 19, wherein the emulator unit is configured to monitor one or more of memory accesses by the executed application, rate of execution, and execution time.

21. The apparatus of claim 13, wherein the emulator unit is further configured to:
receive an identification of the GPU that resides on the device external to the server device;
identify, based on the received identification of the GPU, a particular virtual GPU model of a plurality of virtual GPU models,
wherein the emulator unit is configured to execute the virtual GPU model by at least executing the identified particular virtual GPU model, and
wherein the emulator unit is configured to execute the modified version of the application on the virtual GPU model by at least executing the modified version of the application on the identified particular virtual GPU model.

22. The apparatus of claim 21, wherein the emulator unit is further configured to create the modified version of the application by at least modifying code of the application based on the received identification of the GPU.

23. The apparatus of claim 13, wherein the emulator unit comprises a hardware emulation board, and wherein the hardware emulation board executes the modified version of the application to perform the analysis of the application during execution of the modified version of the application.

24. The apparatus of claim 13, wherein the emulator unit receives at least one of source code and intermediate code of the application, and wherein the emulator unit is further configured to:
  compile at least one of the source code and the intermediate code of the application to generate object code of the modified version of the application; and
  transmit the object code of the modified version of the application to the device.

25. A server device comprising:
  a memory;
  means for receiving an application that is to be executed by a graphics processing unit (GPU) that resides on a device external to the server device;
  means for determining that the application would execute inefficiently on the GPU;
  means for creating, based on the determination that the application would execute inefficiently on the GPU, a modified version of the application that would execute more efficiently on the GPU than the received application;
  means for performing an analysis of the modified version of the application during execution of the modified version of the application on the server device, wherein the means for performing the analysis comprises:
    means for executing a virtual GPU model stored in the memory;
    means for executing the modified version of the application on the virtual GPU model; and
    means for monitoring functionality of the virtual GPU model during the execution of the modified version of the application on the virtual GPU model;
  means for determining whether the modified version of the application satisfies one or more performance criteria based on the analysis; and
  means for transmitting, to the device, the modified code of the application and a validation of the application if the application satisfies the one or more performance criteria.

26. A non-transitory computer-readable storage medium comprising instructions that cause one or more processors to:
  receive an application that is to be executed by a graphics processing unit (GPU) of a device;
  transmit the application and an identification of the GPU to a server device external to the device for validation of the application on a virtual GPU model associated with the identified GPU of the device;
  receive a modified version of the application from the server device, wherein the modified version of the application would execute more efficiently on the GPU; and
  receive a validation from the server device that indicates that the modified version of the application satisfies one or more criteria for execution on the GPU.

* * * * *